United States Patent
Nemirow

(10) Patent No.: US 6,486,644 B1
(45) Date of Patent: Nov. 26, 2002

(54) METHOD AND ARCHITECTURE FOR LIMITING INPUT CURRENT TO A BROADBAND NETWORK POWER SUPPLY

(75) Inventor: Arthur T. Nemirow, El Paso, TX (US)

(73) Assignee: Arris International, Inc., Duluth, GA (US)

( * ) Notice: Subject to any disclaimer, the term of this patent is extended or adjusted under 35 U.S.C. 154(b) by 0 days.

(21) Appl. No.: 09/579,930

(22) Filed: May 26, 2000

Related U.S. Application Data

(60) Provisional application No. 60/136,576, filed on May 28, 1999.

(51) Int. Cl.[7] .............................. G05F 1/46; H02M 3/24
(52) U.S. Cl. ......................................... 323/285; 363/95
(58) Field of Search ................................ 323/283, 284, 323/285, 287; 363/20, 21.01, 21.12, 95

(56) References Cited

U.S. PATENT DOCUMENTS

| | | | | |
|---|---|---|---|---|
| 5,216,569 A | * | 6/1993 | Brookhiser | 361/107 |
| 5,436,822 A | * | 7/1995 | West, Jr. | 363/63 |
| 5,793,590 A | * | 8/1998 | Vokey et al. | 361/79 |
| 5,991,139 A | * | 11/1999 | Kamali et al. | 361/119 |
| 5,995,393 A | * | 11/1999 | Deierlein | 363/49 |

* cited by examiner

*Primary Examiner*—Adolf Deneke Berhane

(57) ABSTRACT

A power supply includes a control circuit that inhibits excessive input current draw during a low-line condition by decreasing a power supply output voltage in response to a measured change in either power supply input voltage or power supply input current. The power supply may be, for example, a cable television distribution network power supply that receives power from the coaxial cable that carries the television or other media signals or, in the case an optical fiber network, an auxiliary power cable associated with the fiber cable that carries the media signals.

14 Claims, 3 Drawing Sheets

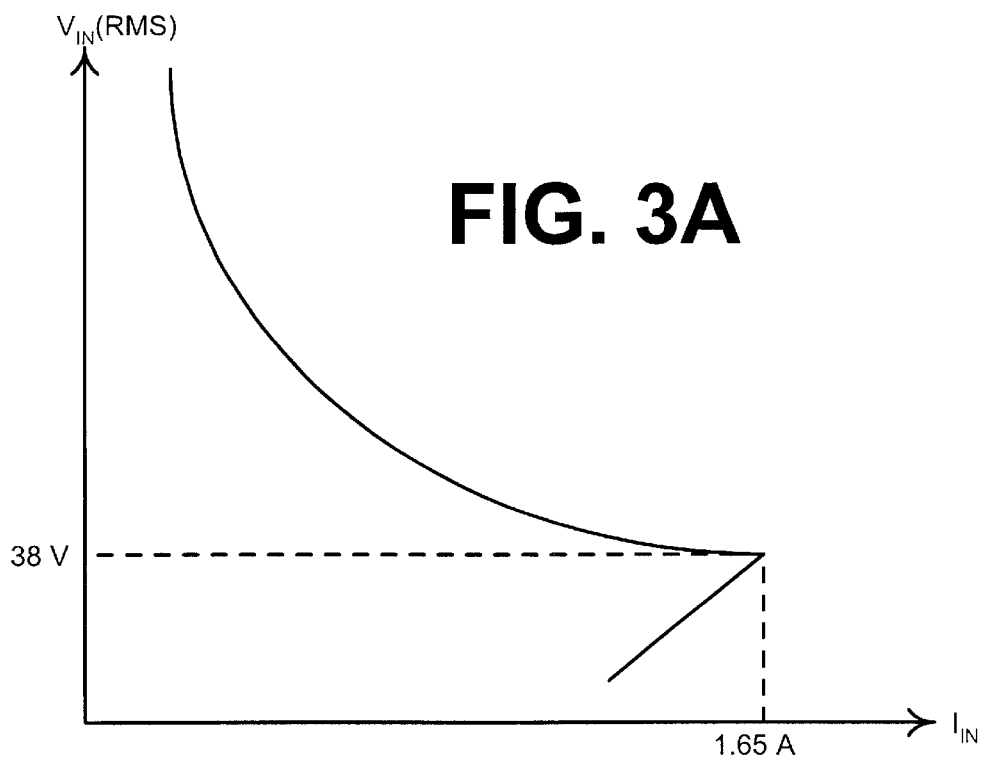
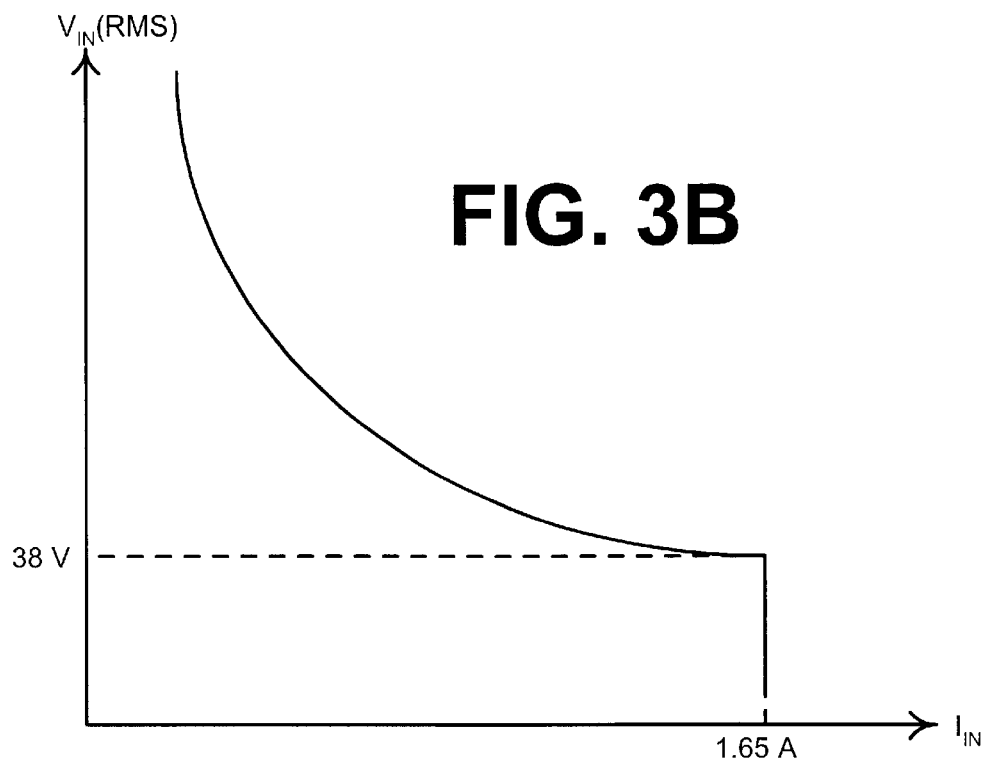

METHOD AND ARCHITECTURE FOR LIMITING INPUT CURRENT TO A BROADBAND NETWORK POWER SUPPLY

CROSS-REFERENCE TO RELATED APPLICATION

The benefit of the filing date of U.S. Provisional Patent Application, Serial No. 60/136,576, entitled "LOW-LINE CURRENT LIMITER," filed May 28, 1999, is hereby claimed, and the specification thereof is incorporated herein in its entirety by this reference.

BACKGROUND OF THE INVENTION

1. Field of the Invention

This invention relates generally to power supply regulation and, more specifically, to inhibiting excessive current draw in a cable television distribution network.

2. Description of the Related Art

Cable television (cable TV or CATV) systems distribute signals from a head end to subscribers ("downstream") through coaxial cable ("coax"), optical fiber, or a combination of coax and fiber commonly referred to as a hybrid network. Such cable network media are strung along telephone poles or through underground conduits.

Amplifiers and other devices are commonly included at intervals, which may be referred to as nodes, along the cable network. Amplifiers and similar devices commonly include active rather than passive electronics and thus require an external source of electrical power. In the case of a coax-based network, power is commonly supplied to each node through the same coax through which the radio frequency (RF) signals, e.g., television signals and digital signals, are carried. A device known as a power inserter or tap mixes power and RF signals for distribution on the coax. The voltage is typically 60 or 90 volts in U.S. cable networks. The power inserter commonly receives the power from a ferro-resonant converter, which in turn receives power from a transformer coupled to a power utility line.

At each network node at which an amplifier or other active device is located, a splitter separates the power from the RF signals. The splitter provides the power to the amplifier power supply. Power is recombined with the RF signals at the node, and the combined signal is placed on the coax for further transmission to downstream nodes. In the case of a hybrid network, the RF signals are carried on the fiber, and the power is carried on the coax; no power inserters or splitters are necessary.

Undesirable brownout or temporary low-voltage conditions may occur in a cable network. In a brownout condition, because the amplifier power supplies are constant-power devices, the dropping of the voltage carried on the coax drops causes the amplifier power supplies to draw more current. The additional current draw on the ferro-resonant converters can cause them to cease operating normally, i.e., cease resonating. Even after the voltage rises again to the normal level, a ferro-resonant converter may fail to re-start, i.e., begin resonating.

To avoid the above-described problem of the ferro-resonant converters failing to restart after a brownout, it has been suggested to include a low-voltage cut-off circuit at each node. A low-voltage cut-off circuit can disconnect an amplifier power supply from the coax when it detects a drop in the voltage below a threshold deemed to define such a brownout condition, such as 41 volts. The cut-off circuit may include hysteresis such that it does not reconnect the power supply until the voltage rises above a different threshold, such as 44 volts.

A problem with the use of low-voltage cut-off circuits is that they can cause undesirable oscillation or instability. The voltage at a node close to the head end may not drop sufficiently to cause a cut-off circuit at that node to disconnect a power supply from the coax supplying the power, but it may drop sufficiently at nodes farther downstream from the head end. As soon as the cut-off circuits at such nodes farther downstream from the head end detect a brownout and disconnect the power supplies from the coax, the voltage rises discontinuously at those disconnecting nodes as a result. The voltage rises discontinuously because no current exists in the coax downstream from the upstream-most disconnecting node. An absence of current implies a zero voltage drop across the resistance of the coax. Thus, the voltage at the disconnecting nodes instantaneously changes to the voltage at the upstream-most node that did not disconnect. Because this voltage is insufficient to cause the cut-off circuit at that node to disconnect, it may be similarly sufficient (i.e., but for hysteresis) to cause the cut-off circuits at nodes farther downstream to reconnect. But because the voltage at the reconnected nodes is still below the cut-off threshold, those nodes again disconnect. This disconnecting and reconnecting of cut-off circuits continues to occur in an oscillatory manner.

It would be desirable to provide a power supply circuit that does not cause oscillation in the event of a brownout condition and that does not hamper the operation of ferro-resonant converters. The present invention addresses these problems in the manner described below.

SUMMARY OF THE INVENTION

The present invention relates to power supply regulation and inhibiting excessive current draw by decreasing a power supply output voltage in response to a measured change in a parameter of the power supply input signal. The parameter can be either power supply input voltage or, alternatively, power supply input current. The power supply can be, for example, a cable television distribution network power supply that receives power from the coaxial cable that carries the television or other media signals or, in the case an optical fiber network, an auxiliary power cable associated with the fiber cable that carries the media signals.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 3A is a graph illustrating folding back the power supply input current in response to a measured decrease in power supply input voltage below a predetermined threshold;

FIG. 3B is a graph illustrating limiting or holding constant the power supply input current in response to a measured decrease in power supply input voltage below a predetermined threshold.

DESCRIPTION OF A PREFERRED EMBODIMENT

Figure 1:
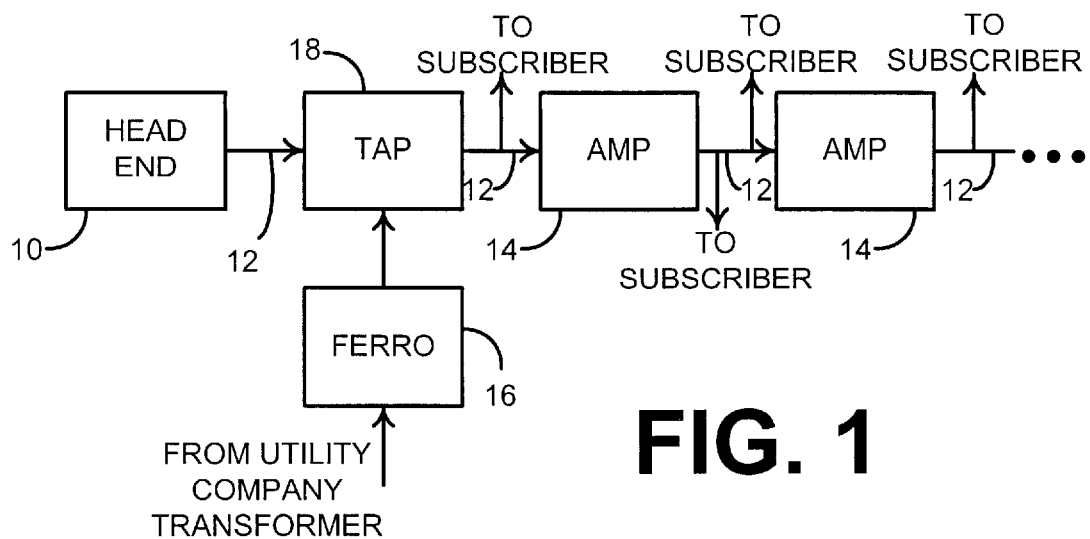
FIG. 1 is a generalized block diagram of a cable media distribution network.

As illustrated in FIG. 1, a cable television system or, more generally, a cable media system, distributes television, computer data and signals of similar media to subscribers. The signals originate at a head end 10 and are distributed via a network of cable 12 that may comprise coaxial cable ("coax") or a hybrid of coax and optical fiber cable. Because cable 12 may extend for great distances, to counteract signal loss due to the resistance of cable 12 and other factors, amplifiers 14 are coupled into cable 12 at various intervals. Each amplifier 14 receives the television, data or other media signals from an upstream segment of cable 12, amplifies or boosts those signals, and places the amplified signals for retransmission on a downstream segment of cable 12. Persons skilled in the art to which the invention pertains will recognize that the illustrated cable system is generalized or simplified for purposes of clarity in describing the invention. Similarly, although arrows are included in FIG. 1 to indicate the downstream direction of signal flow (i.e., from head end 10 to the various subscribers), it is common in cable media systems for signals to be transmitted in the upstream direction as well.

Amplifiers 14 obtain the power required to operate them directly from cable 12 as opposed to a separate power source. Although not illustrated for purposes of clarity, cable 12 can comprise either a single coaxial cable or, alternatively, a two-cable hybrid having an optical fiber signal cable accompanied by a power cable. The present invention is applicable to either type of network. In the case of a coax-based network, amplifiers 14 obtain power from the coax itself. It is common in cable media systems for a power signal to be combined with the television or other media signals on the same coax cable. As indicated in FIG. 1, a power converter device, which is commonly a ferroresonant converter ("ferro") 16, receives power from a utility company transformer (not shown), converts the power to the proper voltage, and provides the converted power signal to a device commonly known as a tap 18 or power inserter. Cable systems in the United States typically provide a power signal of 60 or 90 volts alternating current (VAC). Tap 18 combines or mixes the power signal with the media signals received from head end 10 and places the combined signal on cable 12 for transmission downstream. Although only a single point of power insertion is illustrated for purposes of clarity, cable networks commonly include multiple points of power insertion and thus include multiple ferros 16 and associated taps 18.

Figure 2:
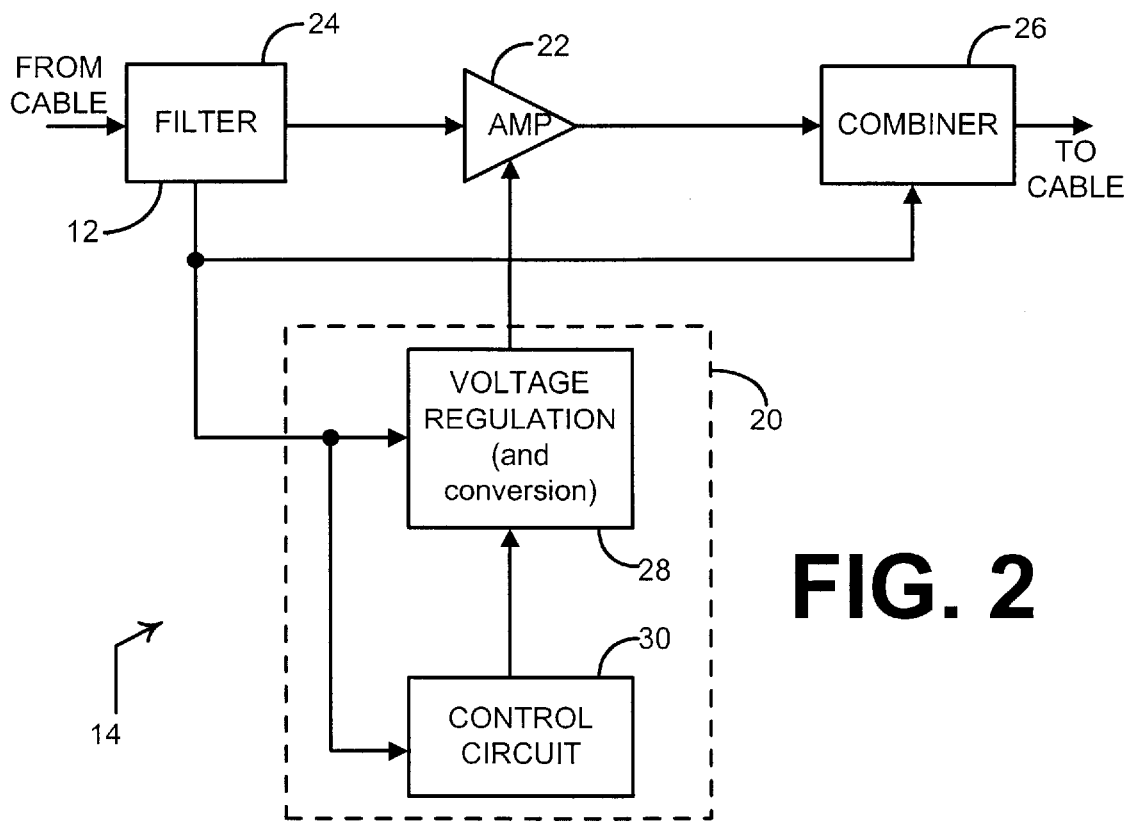
FIG. 2 is a block diagram of a power supply having a control circuit in accordance with the present invention.

As illustrated in FIG. 2, each amplifier 14 includes a power supply circuit 20 that supplies power to the amplifier circuitry 22 itself. In the case of a coax-based network, a power-passing filter 24 is also included. Power-passing filter 24 receives the combined signal from cable 12 (FIG. 1) and separates the power signal component from the television and other media signal components. The media signals are passed to amplifier circuitry 22, which amplifies them and provides the amplified output to a combiner 26. Combiner 26 is similar in function to tap 18 (FIG. 1), combining or mixing the amplified signals with the power signal for downstream transmission on cable 12. Persons skilled in the art to which the invention pertains will recognize that the illustrated amplifier is generalized or simplified for purposes of clarity in describing the invention. Nevertheless, each amplifier 14 includes all of the circuitry and other elements commonly included in cable system amplifiers.

The power signal is also provided to power supply circuit 20. Power supply circuit 20 includes a voltage regulation circuit 28 that rectifies the incoming AC power signal and converts the resulting direct current (DC) signal to the proper voltage. As described in further detail below, voltage regulation circuit 28 includes a feedback loop to provide a regulated output. Power supply circuit 20 also includes a control circuit 30. Control circuit 30 inhibits voltage regulation circuit 28 from drawing excessive input current in the event of a brownout or low-voltage condition. Because voltage regulation circuit 28 is a constant-power device, but for the inclusion of the present invention, the dropping of the power signal voltage input to circuit 28 would cause circuit 28 to draw more input current, as illustrated in FIG. 3A. It has been recognized that such an excessive current draw on cable 12 can hamper the operation of ferro 16 (FIG. 1). The present invention responds to a brownout or low-voltage condition by preventing the power supply input current from increasing. In one embodiment of the invention, it does this by limiting the input current to a predetermined value, i.e., maintaining it constant at that value, when the input voltage decreases below a predetermined threshold. In an alternative embodiment of the invention, it does this by folding back the input current. As described in further detail below, the power supply input current is indirectly controlled in this manner by controlling the power supply output voltage.

FIG. 3A illustrates folding back the input current. Current foldback is a well-understood term of art meaning that there is a relationship between current and voltage that changes in direction as the voltage passes (i.e., increases or decreases beyond) some threshold value. For example, as illustrated in FIG. 3A, input current ($I_{IN}$) increases as input voltage ($V_{IN}$) decreases for all values of voltage below about 38 V. When the voltage decreases below 38 V, the relationship reverses direction, such that input current decreases as input voltage continues to decrease. Thus, although the input current is about 1.65 amperes (A) when the input voltage is about 38 V, the input current decreases in direct proportion to a subsequent decrease in input voltage. Note that although in FIG. 3A input current decreases in direct proportion to input voltage in the foldback region, such that the $V_{IN}$–$I_{IN}$ relation is described by a straight line, in other embodiments of the invention input current can decrease in some other relation to input voltage in the foldback region, such that the $V_{IN}$–$I_{IN}$ relation is described by some other curve.

FIG. 3B illustrates limiting the input current to a predetermined threshold value. Thus, input current ($I_{IN}$) remains at a constant value of, for example, about 1.65 amperes (A) as the input voltage ($V_{IN}$) decreases for all values of input voltage below a threshold value of about 38 V.

Note that the curve that describes the $V_{IN}$–$I_{IN}$ relation can be of any suitable shape such that the input current does not exceed a predetermined threshold value when the input voltage is above a predetermined threshold value. Thus, for example, a combination of the above-described current-limiting and current-foldback methods would be suitable.

Also note that in FIGS. 3A and 3B the threshold values of 38 V and 1.65 A, as well as other values of voltage and current with which the axes of these graphs are labeled, are intended to be exemplary only. The invention should prevent the input current from increasing above some threshold value that depends upon the value above which the operation of the ferro-resonant converters or other elements of the particular cable system in which the invention is included is believed to be adversely affected.

Figure 4:
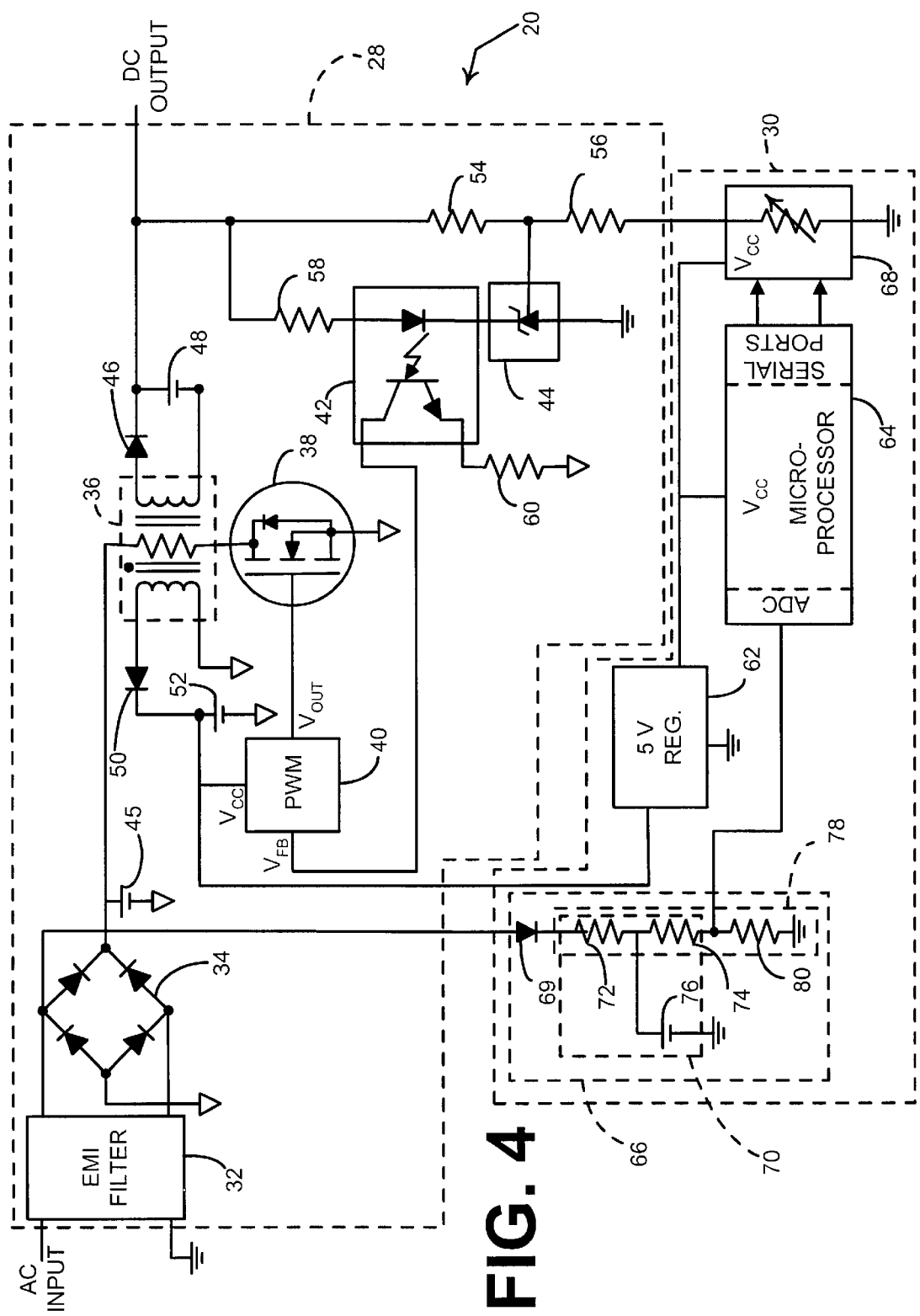
FIG. 4 is a schematic diagram of the power supply.

Voltage regulation (and conversion) circuit 28 and control circuit 30 of power supply circuit 20 are illustrated in further detail in FIG. 4. Voltage regulation (and conversion) circuit 28 includes an electromagnetic interference (EMI) filter 32, a bridge rectifier 34, a flyback transformer 36, a power field-effect transistor (FET) 38, a pulse-width modulator (PWM) 40, an opto-coupler 42 and a voltage regulator 44. This power supply topology is well-known in the art and commonly includes some other elements that are not illustrated in FIG. 4 for purposes of clarity. In operation, EMI filter 32 filters the input power signal. Bridge rectifier 34 converts or rectifies the filtered power signal. A holdup capacitor 45 smooths the rectified signal. Flyback transformer 36 forms the heart of a flyback converter that performs a high-frequency DC—DC conversion. Because the flyback converter configuration is well-known in the art, its structure and operation are only briefly described, as follows. The primary winding of flyback transformer is coupled to the rectified and smoothed signal and to the drain terminal of FET 38. One secondary winding of flyback transformer 36 is coupled a flyback diode 46 and a flyback capacitor 48, and another secondary winding of flyback transformer 38 is coupled to another flyback diode 50 and another flyback capacitor 52. The output of the flyback converter is produced across capacitor 48 and is fed back to the flyback converter to provide voltage regulation.

The feedback loop for the flyback converter comprises opto-coupler 42, voltage regulator 44 and PWM 40. Two resistors 54 ($R_A$) and 56 ($R_B$) form a voltage divider that determines the relationship between the regulation voltage ($V_R$) of voltage regulator 44 and the output voltage ($V_O$) of the flyback converter in accordance with the following formula: $V_R=V_O(R_A/(R_A+R_B))$. Voltage regulator 44 can be, for example, a T1431AID Programmable Precision Reference, produced by Texas Instruments.

Opto-coupler 42 is controlled by the output of voltage regulator 44 and is coupled to the output of the flyback converter by a resistor 58. Opto-coupler 42 isolates the portion of the power supply circuitry that is referenced to power ground (its symbol consisting of a triangle), including bridge rectifier 34 and FET 38, from the portion that is referenced to chassis ground (its symbol consisting of three parallel lines arranged in a pyramid), including the flyback transformer 36. The phototransistor emitter terminal of opto-coupler 42 is coupled to the reference voltage or feedback terminal of PWM 40. Another resistor 60 couples the phototransistor collector terminal of opto-coupler 42 to power ground.

The output of PWM 40 is coupled to the gate terminal of FET 38. PWM 40 receives its power signal ($V_{cc}$) from the secondary winding of flyback transformer 36 that is coupled to capacitor 52 and diode 50. That same power signal $V_{cc}$ is provided to a five volt regulator 62.

Control circuit 30 includes a microprocessor 64, a half-wave rectifier/prescaler circuit 66 and a digital potentiometer 68. Circuit 66 is coupled directly to the output of EMI filter 32 and regulates the input voltage of the power supply. Microprocessor 64 can be, for example, a PIC16F87X, 8-Bit CMOS FLASH Microcontroller, produced by MicroChip Technology Inc. of Chandler, Arizona. Digital potentiometer 68 can be, for example, a DS1802 Addressable Dual Digital Potentiometer produced by Dallas Semiconductor of Dallas, Tex. Circuit 66 includes a diode 69 that functions as a half-wave rectifier, a filter 70, which is formed of two resistors 72 and 74 and a capacitor 76, and a scaling voltage divider 78, which is formed of resistors 72 and 74 and a third resistor 80. Microprocessor 64 and digital potentiometer 68 are powered by the output of five volt regulator 62.

An analog-to-digital converter (ADC) input of microprocessor 64 receives the output of circuit 66. This signal represents the power supply input voltage. Microprocessor 64 digitizes this input voltage signal, determines its root-mean-square (RMS), and performs an algorithm in accordance with its programming that causes the power supply output voltage to be selected or set in response to the RMS of the power supply input voltage. The power supply output voltage changes because microprocessor 64 controls digital potentiometer 68. A two-line serial port output of microprocessor 64 is coupled to the control input of digital potentiometer 68. Digital potentiometer 68 sets its resistance in response to a byte that microprocessor 64 outputs on this serial port. Digital potentiometer 68 can have, for example, 256 discrete values of resistance by setting the byte to a value between zero and FF hexadecimal. Note that because digital potentiometer 68 is in series with resistor 50 ($R_B$), increasing their combined resistances causes the power supply output voltage ($V_O$) to decrease because the regulated voltage ($V_R$) remains constant. (See formula above.)

Microprocessor 64 computes a true RMS of the input voltage rather than an approximation of it because the shape of the input waveform is not predictable with great accuracy. The waveform shape can vary depending upon the type of ferro-resonant converters 16 in the cable system, the type and resistance per unit length of cable 12, and other factors. Computing the true RMS input voltage makes power supply 20 sufficiently versatile to use in any cable system without modification, regardless of the electrical characteristics of ferro-resonant converters 16, cable 12 or other elements. The term "true" RMS is intended to refer to a computation based upon numerical integration of the waveform or a similar numerical technique. In contrast to a true RMS computation, circuits are known that estimate RMS in response to peak voltage or some other detected value, based upon a presumed waveform shape. The following steps define a true RMS computation and can be included in the programming of microprocessor 64:

1. Detect the next rising edge of the input waveform;
2. Digitize the waveform between successive rising edges into N discrete values at intervals of, for example, 150 microseconds ($\mu$s);
3. Square each of the N measured values;
4. Sum the squared N values;
5. Divide the sum of the squares by the quantity ($150\mu S \times N$);
6. Compute the square root of the sum of the squares;
7. Multiply the result by a scaling factor to compensate for the voltage divider and half wave rectification; and
8. Repeat steps 1–7.

Microprocessor 64 is programmed in a suitable manner, such as through the use of a loop structure or interrupts, to continually monitor and respond to this RMS power supply input voltage. So long as this RMS voltage does not drop beyond a threshold of, for example, 38 VDC, microprocessor 64 does not adjust the resistance of digital potentiometer 68. (Similarly, in embodiments of the invention in which input current is monitored instead of input voltage, so long as the input current does not rise beyond a threshold value, the resistance is not adjusted.) At power-up, digital potentiometer 68 defaults or resets to its lowest resistance, which corresponds to an input byte of 00 hexadecimal. Microprocessor 64 therefore continues to send a value of 00 hexadecimal to digital potentiometer 68 until it measures a drop in RMS input voltage beyond the threshold. It has been found that, in some cable systems, a RMS voltage below about 38 VDC can be problematic. Therefore, a brownout or undesirable low-voltage condition can be defined in such systems as a condition in which the RMS input voltage is less than 38 VDC. When microprocessor 64 measures a RMS input voltage less than 38 VDC, it increases the value of the byte that it sends to digital potentiometer 68, thereby causing digital potentiometer 68 to increase its resistance. The increased resistance causes the output voltage of power supply circuit 20 to decrease. The decreased power supply output voltage inherently causes the power supply input current to decrease (i.e., be folded back) or, alternatively or in addition, to remain constant (i.e., to be limited). The results of these methods are described above with respect to FIGS. 3A and 3B.

Microprocessor 64 can be programmed in accordance with the following equation in embodiments of the invention in which control circuit 30 causes the power supply input current to remain constant (i.e., to be limited) in response to a decrease in power supply input voltage:

$$V_o = C\sqrt{V_i} \tag{1}$$

where $V_o$ is power supply output voltage, $V_i$ is power supply input voltage, and C is a constant.

This equation can be derived as follows:

$$P_i = P_o/\eta \tag{2}$$

where $P_o$ is output power, $P_i$ is input power, and $\eta$ is efficiency;

$$P_i = V_i \cdot I_i \cdot PF \tag{3}$$

where $V_i$ is input voltage, $I_i$ is input current, and PF is power factor;

$$P_o = \frac{V_o^2}{RL} \tag{4}$$

where RL is output load resistance.

Equation 1 can be rewritten in terms of equations 2 and 3:

$$V_i \cdot I_i \cdot PF = \frac{(V_o^2/RL)}{\eta} \tag{5}$$

$$\Rightarrow V_i \cdot I_i \cdot PF = \frac{V_o^2}{\eta RL} \tag{6}$$

To obtain output voltage $V_o$ as a function of the measured RMS input voltage $V_i$ for a constant input current $I_i$, assume $I_i$, PF, RL and $\eta$ are constants and rewrite equation 6 with the constants collected together:

$$V_o = V_i(I_i \cdot PF \cdot RL \cdot \eta) \tag{7}$$

$$\rightarrow V_o = \sqrt{V_i}\sqrt{I_i \cdot PF \cdot RL \cdot \eta} \tag{8}$$

Letting C represent the constant portion of equation 8 results in equation 1 above. Thus, the power supply input current can be held constant by varying the output voltage $V_o$ as a function of the square root of the input voltage $V_i$.

Alternatively, microprocessor 64 can be programmed in accordance with the following equation in embodiments of the invention in which control circuit 30 causes the power supply input current to decrease linearly (i.e., to be folded back linearly) in response to a decrease in power supply input voltage:

$$V_o = D \cdot V_i \tag{9}$$

The line equation y=mx+b, where x and y are the horizontal and vertical axes, m is the slope and b is the y-intercept, can be modified to describe the linear foldback region (see FIG. 3A):

$$V_i = \frac{\Delta V_i}{\Delta I_i}I_i + b \tag{10}$$

Letting b=0 for the zero asymptote case, and letting $\Delta V_i/\Delta I_i$ equal a constant K for a constant positive slope, $$V_i = K I_i \tag{11}$$

From equation 6, $$I_i = \frac{V_o^2}{\eta RL \cdot V_i \cdot PF} \tag{12}$$

Combining equations 11 and 12, $$V_i = K\frac{V_o^2}{\eta RL \cdot V_i \cdot PF} \tag{13}$$

$$\Rightarrow V_i^2 = \frac{KV_o^2}{\eta \cdot RL \cdot PF} \tag{14}$$

$$\Rightarrow V_i^2 = \frac{K}{\eta \cdot RL \cdot PF}V_o^2 \tag{15}$$

Substituting a constant B for the constant portion of equation 15, $$V_i^2 = B \cdot V_o^2 \tag{16}$$

$$\Rightarrow V_1 = \sqrt{B} \cdot V_0 \tag{17}$$

$$\Rightarrow V_o = \left(\frac{1}{\sqrt{B}}\right) \cdot V_i \tag{18}$$

Substituting a constant D for the constant quantity in equation 18 results in equation 9 above. Thus, the power supply input current can be linearly folded back by varying the output voltage $V_o$ in direct proportion to the input voltage $V_i$. As noted above, although linear foldback is used as an example, the foldback can be in accordance with relations other than linear.

The present invention can prevent power supplies, such as those of a cable television distribution system, from drawing excessive input current in the event of a brownout or low-voltage condition. The invention responds to a brownout condition in a continuous, controlled manner that does not hamper the operation of ferro-resonant converters.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. For example, although a microprocessor is included in the illustrated embodiment for purposes of controlling the output voltage (and thus the input current indirectly), it should be apparent that in other embodiments of the invention the control circuit may be analog in nature rather than digital as in a microprocessor. Also, for example, although the control circuit in the illustrated embodiment monitors power supply input voltage and controls power supply output voltage in response to the monitored voltage, in other embodiments of the invention it may monitor power supply input current and control power supply output voltage in response to the monitored current, as the voltage and current are corresponding parameters of power supply input power. It is intended that the specification and examples be considered as exemplary only, with a true scope and spirit of the invention being indicated by the following claims.

What is claimed is:

1. A method for power supply regulation, comprising:

monitoring a parameter of input power in a power supply circuit, said parameter selected from the group consisting of input voltage and input current;

measuring a change in said parameter; and decreasing an output voltage in said power supply circuit in response to said change in said parameter, whereby an input current in said power supply circuit is prevented from increasing.

2. The method claimed in claim 1, wherein said decreasing step comprises decreasing said output voltage in response to said change in said parameter only when said parameter is beyond a predetermined threshold.

3. The method claimed in claim 1, wherein said measuring step comprises computing a root-mean-square (RMS) of said parameter.

4. The method claimed in claim 1, wherein said decreasing step comprises decreasing said output voltage an amount that folds back an input current of said power supply circuit.

5. The method claimed in claim 4, wherein said decreasing step comprises decreasing said output voltage in response to said change in said parameter only when said parameter is beyond a predetermined threshold.

6. The method claimed in claim 4, wherein said decreasing step comprises a microprocessor controlling a voltage feedback loop of said power supply circuit.

7. The method claimed in claim 6, wherein said decreasing step comprises said microprocessor controlling a digital potentiometer.

8. A power supply circuit, comprising:

a voltage regulation circuit receiving an input signal having an input voltage and an input current and providing an output signal having an output voltage and an output current; and a control circuit coupled to said voltage regulation circuit, said control circuit monitoring a parameter of input power, said parameter selected from the group consisting of said input voltage and said input current, said control circuit measuring a change in said parameter monitored, and decreasing said output voltage in response to said change in said parameter, whereby said input current is prevented from increasing.

9. The circuit claimed in claim 8, wherein said control circuit decreases said output voltage in response to said change in said parameter only when said parameter is beyond a predetermined threshold.

10. The circuit claimed in claim 8, wherein said control circuit includes processing logic computing a root-mean-square (RMS) of said input voltage.

11. The circuit claimed in claim 8, wherein said control circuit decreases said output voltage an amount that folds back said input current.

12. The circuit claimed in claim 11, wherein said control circuit decreases said output voltage in response to said decrease in said parameter only when said parameter is beyond a predetermined threshold.

13. The circuit claimed in claim 11, wherein said control circuit includes a microprocessor controlling a voltage feedback loop of said voltage regulation circuit.

14. The circuit claimed in claim 13, wherein said microprocessor controls a digital potentiometer.

* * * * *